US012479066B2

(12) United States Patent
Lee

(10) Patent No.: US 12,479,066 B2
(45) Date of Patent: Nov. 25, 2025

(54) ATOMIZER UNIT FOR BLADE SHARPENING DEVICE

(71) Applicant: Alex Lee, Vancouver, WA (US)

(72) Inventor: Alex Lee, Vancouver, WA (US)

( * ) Notice: Subject to any disclaimer, the term of this patent is extended or adjusted under 35 U.S.C. 154(b) by 450 days.

(21) Appl. No.: 18/061,650

(22) Filed: Dec. 5, 2022

(65) Prior Publication Data

US 2024/0181599 A1 Jun. 6, 2024

(51) Int. Cl.

| | |
|---|---|
| ***B24B 55/02*** | (2006.01) |
| ***B05B 17/06*** | (2006.01) |
| ***B24B 3/36*** | (2006.01) |
| ***B24B 53/007*** | (2006.01) |

(52) U.S. Cl.

CPC .......... *B24B 55/02* (2013.01); *B05B 17/0607* (2013.01); *B24B 3/36* (2013.01); *B24B 53/007* (2013.01)

(58) Field of Classification Search

CPC .............. B05B 12/002; B05B 17/0653; B05B 17/0646; B05B 17/06; B05B 17/0607; B05B 7/0012; A46B 15/0022; B24B 55/02; B24B 55/03

See application file for complete search history.

(56) References Cited

U.S. PATENT DOCUMENTS

| | | | | |
|---|---|---|---|---|
| 2018/0280233 | A1 * | 10/2018 | Aragon ................ | A46B 13/008 |
| 2021/0161285 | A1 * | 6/2021 | Chen .................... | B65D 83/285 |

* cited by examiner

*Primary Examiner* — Christopher R Dandridge

(74) *Attorney, Agent, or Firm* — Mark S Hubert PC

(57) ABSTRACT

A water atomizing unit that affixes to a blade sharpening device to cool, lubricate and clean the blade and sharpening disc. The unit pumps atomized water vertically downward and funnels the atomized fluid into a linear spray. The length and shape of the linear spray pattern is set by an elliptical array of bristles affixed to the bottom of the funnel. The spray deposits the clean water uniformly onto the blade and disc, keeping the blade temperature uniform across its length and width. The elliptical bristle array allows atomized water droplets to condense onto the bristles so as to define an elliptical ring of larger dripping water drops. The unit uses ultrasonic atomization in which the water is crushed and torn into small droplets by the energy of ultrasonic oscillation. The ultrasonic atomization is accomplished by a single piezo ultrasonic atomization device powered by a USB configured DC power supply.

5 Claims, 5 Drawing Sheets

FIG. 3
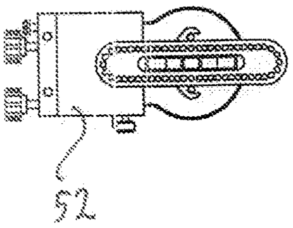
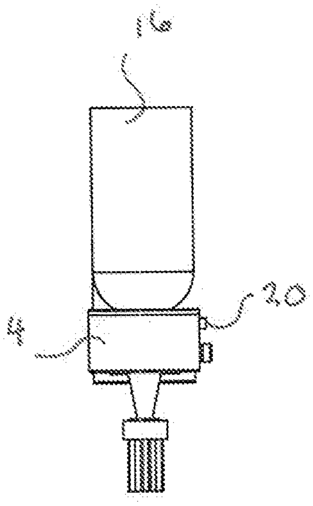
FIG. 4
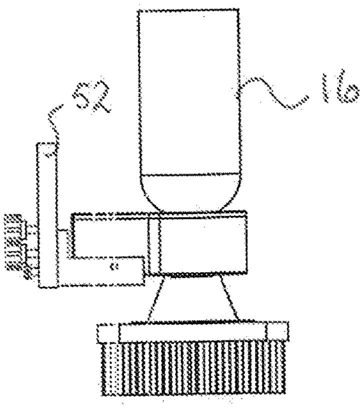
FIG. 5
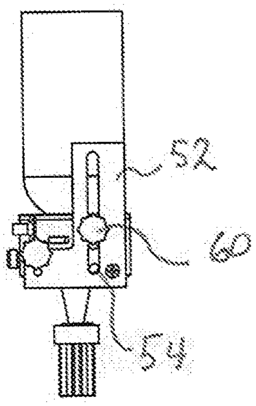
FIG. 6
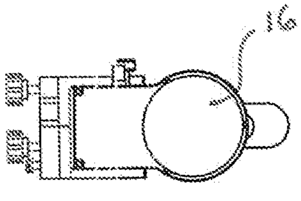
FIG. 7

ATOMIZER UNIT FOR BLADE SHARPENING DEVICE

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to a device for providing lubricating and cooling water to a rotating sharpening disc and blade, and more particularly to blade sharpening technology.

BACKGROUND

Blades as found on scissors and knives, are sharpened professionally by drawing a blade across a series of smaller grits of sharpening stones or across a series of smaller grits of rotating sharpening discs. As the blades are sharpened, generally a small stream of water is pumped across the sharpening discs. This removes the worn away disc material as well as the removed steel from the blade, all while it keeps the steel cool. Heating the edge to any temperature over 150° C./300°F threatens the edge temper, between 200-260° C. (400-500°F) edge in many knife steels over-temper and soften. This can occur quickly along the length of the blade or in localized areas. These watering systems use a small pump that draws recirculated water from a vessel beneath the sharpening discs. The problem is that these pumps pump dirty water with bits of both the discs and the blade onto the sharpening discs and the blade. This necessitates changing the water frequently or the pump will clog. Also, the water is applied in a localized area onto the blade and disc via a small stream from the pump. This small stream has enough velocity to allow it to spread across a larger area but causes splashing. Since it is a small directed stream, it does not do a good job of uniformly keeping the entire blade cool.

Henceforth, a device that provides clean water, in the correct amount evenly across a large area of blade and sharpening disc would fulfill a long felt need in the blade sharpening industry. This new invention utilizes and combines known and new technologies in a unique and novel configuration to overcome the aforementioned problems and accomplish this.

BRIEF SUMMARY

In accordance with various embodiments, a USB powered atomizer for attachment to a blade sharpening device is provided.

In one aspect, a low voltage DC powered water cooling and lubricating system for a blade sharpening device is provided.

In another aspect, an atomized mist funneled into a bristled linear nozzle so as to allow a linear profile to evenly quench the blade being sharpened, is provided.

In yet another aspect, an atomizer, connectable to a blade sharpening device in a vertically adjustable manner, and capable of being powered by a USC power battery pack.

In yet another aspect, a non-recirculating atomizing water supply with a gravity feed, single use, clean water reservoir that provides atomized water into a linear nozzle for disbursement or contact blade quenching.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

FIG. 3 is a bottom view of the atomizer;

FIG. 4 is a front view of the atomizer;

FIG. 5 is a side view of the atomizer;

FIG. 6 is a rear view of the atomizer;

FIG. 7 is a top view of the atomizer;

DETAILED DESCRIPTION OF CERTAIN EMBODIMENTS

Figure 1:
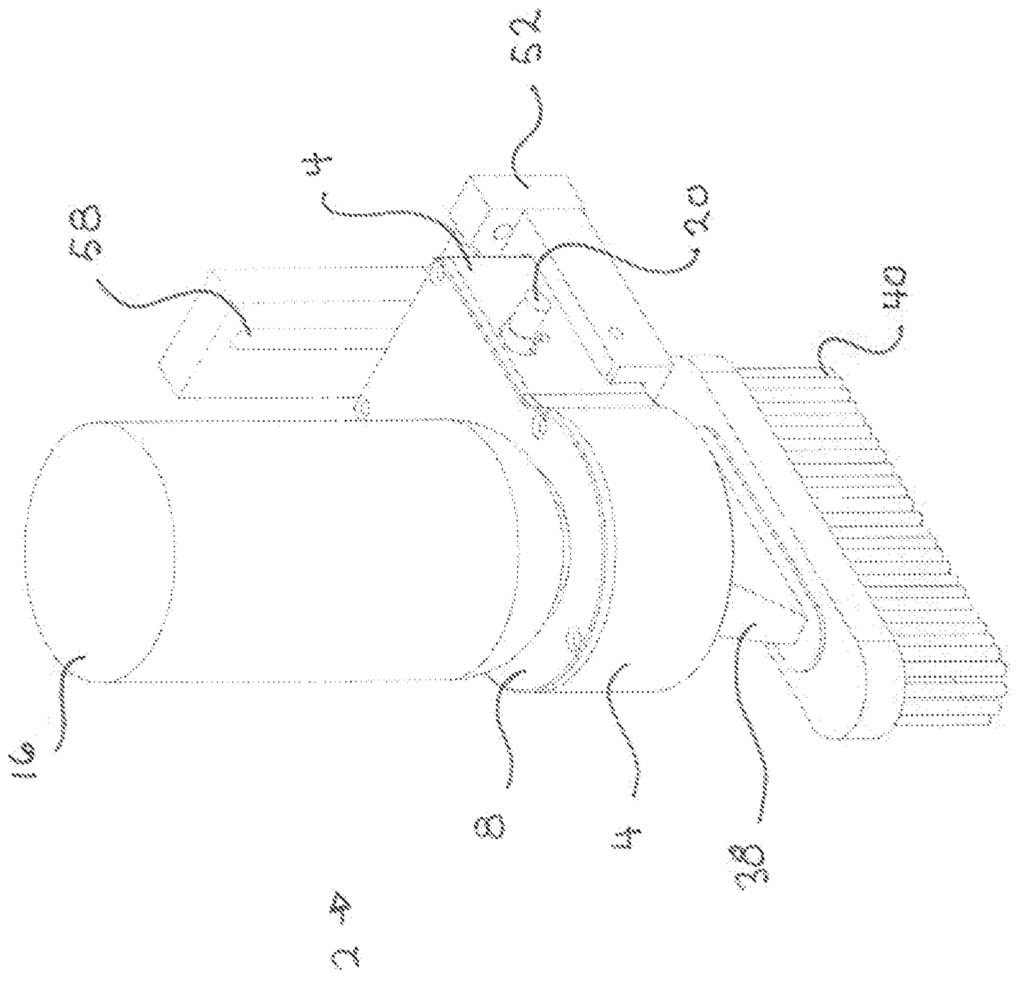
FIG. 1 is a side perspective view of the atomizer.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details.

The terminology used in the description of the inventive concept herein is for the purpose of describing particular embodiments only and is not intended to be limiting of the inventive concept. As used in the description of the inventive concept and the appended claims, the singular forms “a,” “an,” and “the” are intended to include the plural forms as well, unless the context clearly indicates otherwise. It will also be understood that the term “and/or” as used herein refers to and encompasses any and all possible combinations of one or more of the associated listed items. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof.

In the following description, for the purposes of explanation, numerous specific details are set forth in order to provide a thorough understanding of the described embodiments. It will be apparent to one skilled in the art, however, that other embodiments of the present invention may be practiced without some of these specific details. It should be appreciated that the features described with respect to one embodiment may be incorporated with other embodiments as well. By the same token, however, no single feature or features of any described embodiment should be considered essential to every embodiment of the invention, as other embodiments of the invention may omit such features.

As used herein, the term "piezoelectric transducer," "piezo ultrasonic atomization device," "transducer" and "ultrasonic atomization transducer" are the same device. The "ultrasonic atomizing module" includes the "piezoelectric transducer" and its "ultrasonic atomizing driving circuit."

The present invention relates to a novel design for a USB powered, self-contained, clean fluid atomizer that may be attached to a blade sharpening device. The benefits of this device are apparent. It needs only have a USB DC voltage power supply to operate, which can come from an AC/DC converter or via a portable power bank. It uses gravity fed, single pass clean water so it does not clog. It uses atomized water so there is no splashing. It consolidates and funnels the atomized fluid into a linear spray that deposits the clean water uniformly onto the blade and disc, keeping the blade temperature uniform across its length and width while lubricating the disc and removing debris. Its fluid is easily refilled without the need to clean the fluid supply vessel. It is height adjustable so that it may present its atomized spray at any desired distance from the blade. Lastly, it has a congregating brush that prevents the low pressure atomized fluid from drifting sideways away from the blade and provides a linear cooling and lubricating water supply along the blade's length.

The unit uses ultrasonic atomization in which the water is crushed and torn into small droplets by the energy of ultrasonic oscillation. Here, the ultrasonic atomization is accomplished by a single piezo ultrasonic atomization device (ultrasonic atomization transducer), because this type of ultrasonic atomization has the advantages of finely atomizing the water particles and the ultrasonic atomization transducer has good longevity. In alternate embodiments, microporus mesh atomization or Langevin transducer atomization may be used.

Figure 2:
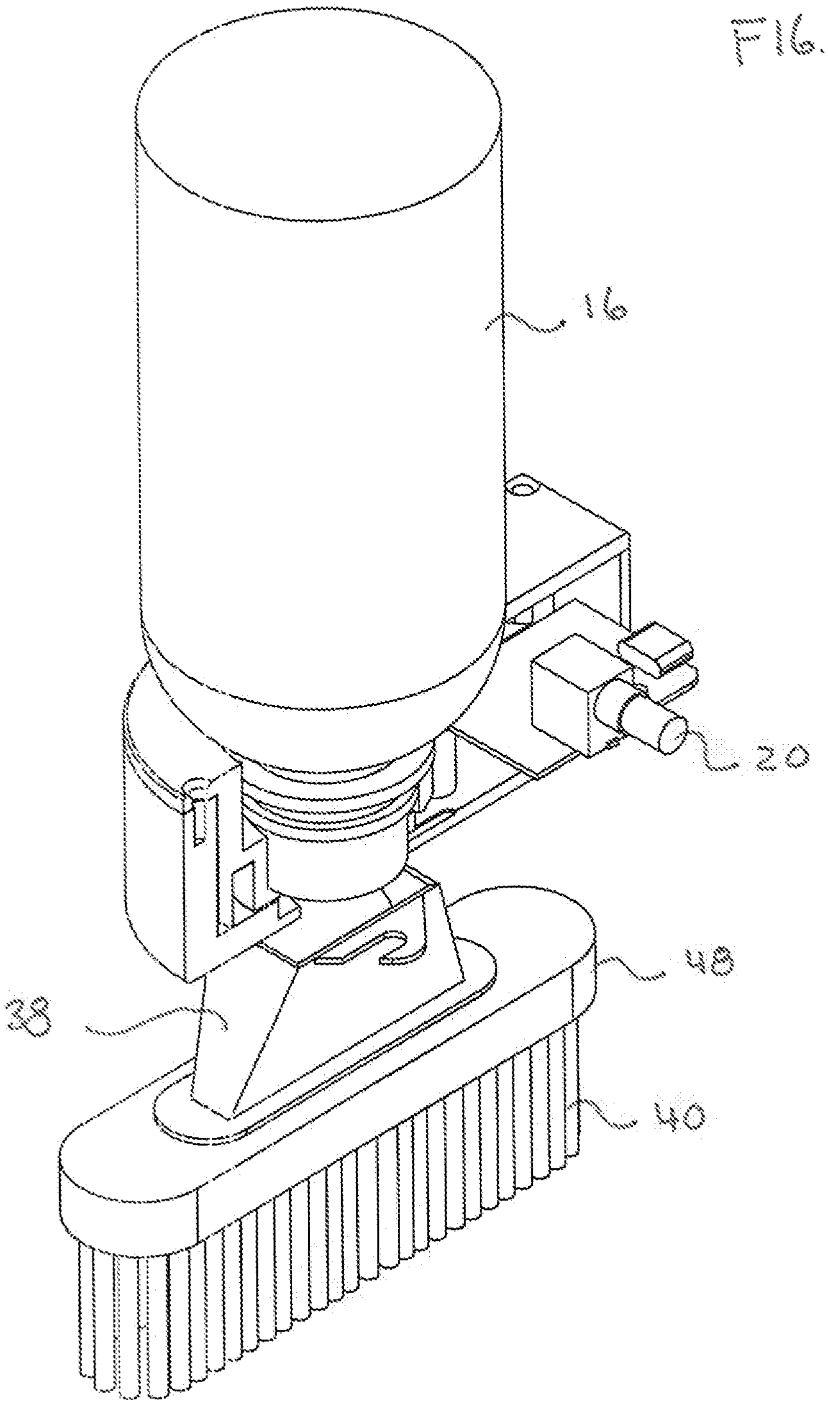
FIG. 2 is a partial cross sectional side perspective view of the atomizer.
Figure 8:
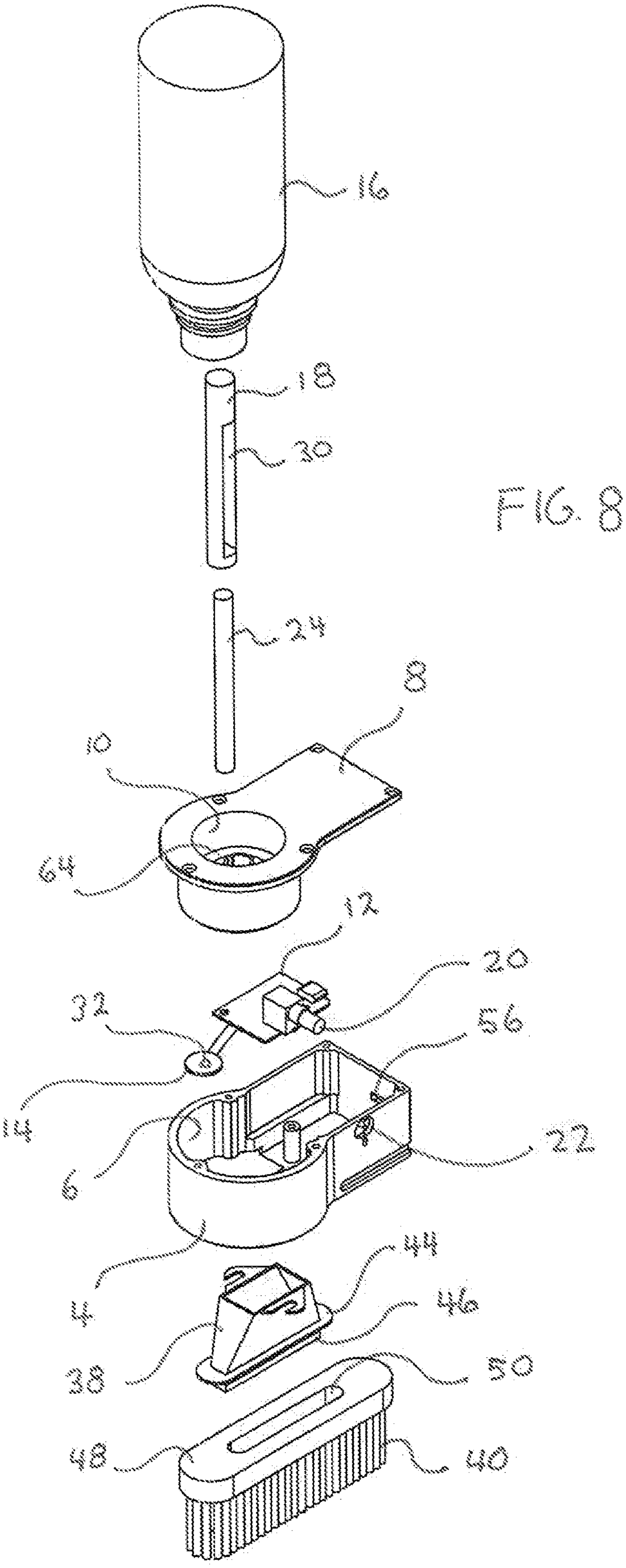
FIG. 8 is an exploded side perspective view of the atomizer.
Figure 9:
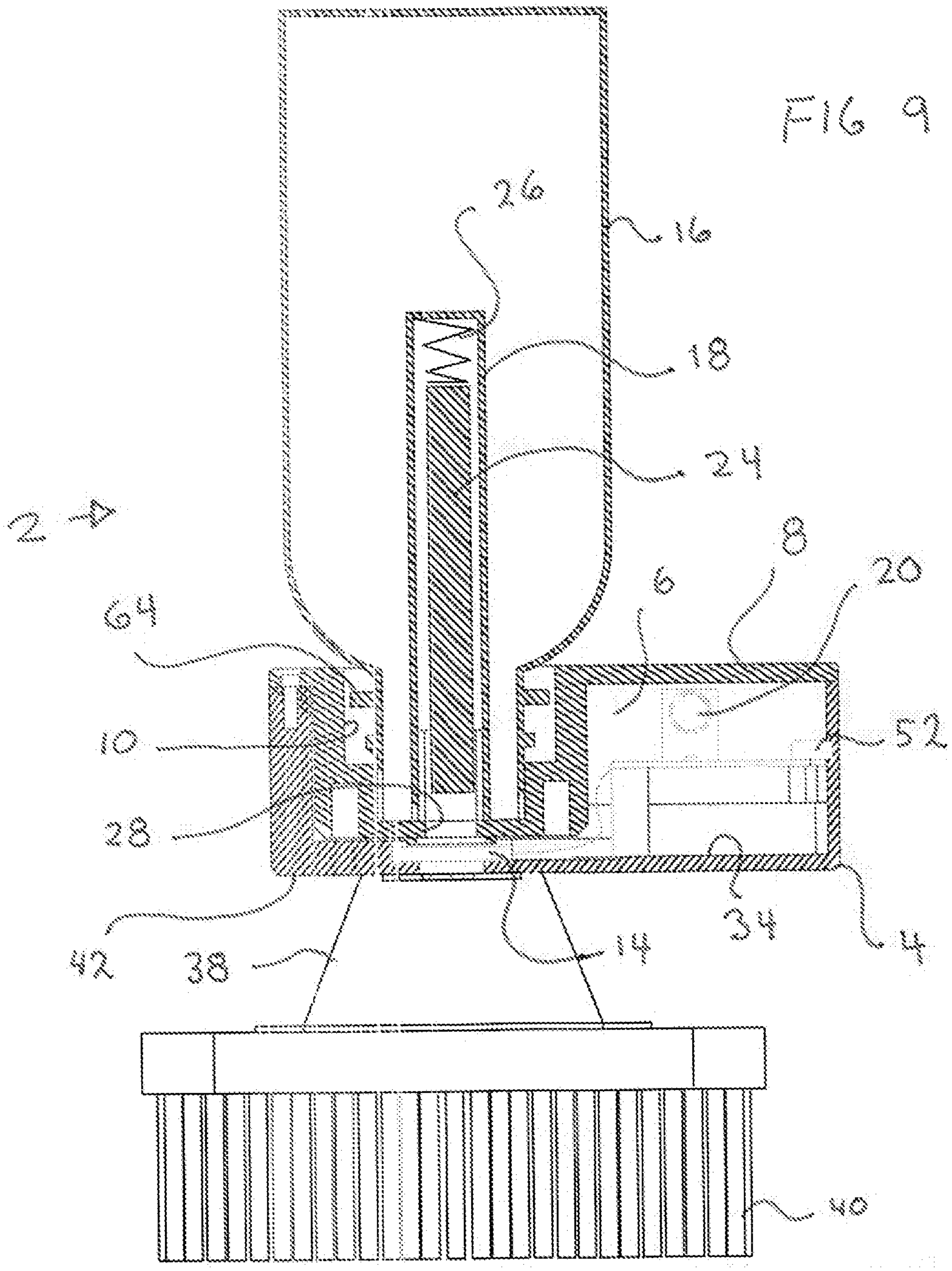
FIG. 9 is a side cross sectional view of the atomizer.

Looking at FIGS. 1, 2, 8 and 9, it can best be seen that the atomizer unit 2 has a housing body 4 with an inner cavity 6 and a top cover 8 that mechanically attaches thereto. The top cover 8 has a concave well 10 formed thereon that mechanically accepts the reservoir vessel 16 when it is turned upside down. The concave well has an internal thread 62 that matingly engages an external thread 64 formed on the neck of the reservoir vessel 16.

Within the reservoir vessel 16 is a vertically slotted feed tube 18 that has a vertically moveable plunger 24 therein that is downwardly biased 18 by a wound compression spring 26. When the plunger 24 is fully biased downward by the spring 26, it forms a seal with the feed tube 18 so that water may only exit the feed tube 18 through its vertical slots when the plunger is pushed upward. This occurs when the reservoir vessel is inserted into the well 10, and prevents the water from coming out when the reservoir vessel is inverted.

Housed within the rear of the housing body 4, outside of the well 10 of the top cover 8, is the ultrasonic atomizing driving circuit 12 which is operationally connected to the ultrasonic atomization transducer 14. The transducer 14 is located in the housing body 4 directly below the well's central orifice 28 and is aligned with the vertical axis of the feed tube 18 in the reservoir vessel 16. When the reservoir vessel 16 is filled with water and placed in the well 10, the plunger 24 rises and water may flow from the reservoir vessel 16 through the vertical slots 30 in the feed tube 18. This presents clean water from the reservoir vessel 16 to the central orifice (nozzle) 32 in the top face of the single piezo ultrasonic transducer 14. An on/off power switch 20 mounted on the PCB that houses the ultrasonic atomizing driving circuit 12, extends through an orifice 22 in the side of the housing body 4.

The piezo ultrasonic transducer 14 is sandwiched between the inner bottom face 34 of the housing body 4 and the outer bottom face of the well 10. This transducer 14 is centered below the well orifice 28 and above the atomized water delivery orifice 36 formed through the bottom face 34 of the housing 4. It is through this atomized water delivery orifice 36 that the piezo ultrasonic transducer 14 downwardly pumps the water droplets that it ultrasonically atomizes. There is a power socket 52 located at the back of the housing body that provides the power to operate the ultrasonic atomizing driving circuit 12. In the preferred embodiment this power socket will accommodate a USB charger connection.

Onto the exterior bottom face 42 of the housing body 4, centered around the atomized water delivery orifice 36, there is an inverted funnel 38. At the bottom end of the inverted funnel 38 there is a peripheral flange 44 and a hollow, elliptical tab 46 that matingly engages and seals with a through socket 50 formed in the top face of the of the elliptical substrate base 48 that the elliptical bristle array 40 extends downward from.

Looking at FIGS. 1 and 3-5, it can be seen that the atomizer unit 2 is mechanically mounted onto an "L" shaped mounting bracket 52 affixed to a blade sharpening device (not illustrated.) The back face of the atomizer housing 4 has a guide pin 54 and a threaded recess 56 formed therein, that aligns with a vertical slot 58 in the mounting bracket 52. A threaded mechanical fastener with a knob thereon 60 threads into the threaded recess 56 and when tightened, frictionally connects the atomizer unit 2 in a vertically adjustable position, while the guide pin 54 prevents the atomizer unit 2 from rotating and losing vertical alignment, as it is frictionally engaged to the bracket 52. The atomizer unit 2 is now adjustably positioned above the sharpening disc, ready for use.

In operation, after the atomizer unit 2 is correctly affixed and vertically adjusted on the mounting bracket 52, the reservoir vessel 16 is filled with clean water and screwed into the well 10 of the top cover 8 such that the plunger 24 is forced upward and the feed tube 18 contacts the top face of the transducer 14. This feed tube 18 in the reservoir vessel 16 ensures that only clean water is presented by gravity feed from the reservoir vessel 16, to the ultrasonic nozzle 32 which is a large orifice in the top face of the piezoelectric transducer 14. (Unlike pressure nozzles, ultrasonic nozzles do not force liquids through a small orifice using high pressure in order to produce a spray. Liquid is fed through the center of a nozzle with a relatively large orifice, without pressure, and is atomized due to ultrasonic vibrations in the nozzle.) The atomizer unit 2 is connected to a DC power supply (preferably via a USB connector) and the power switch 20 is turned on. When the water enters the piezoelectric transducer 14, a high-frequency mechanical oscillation converts the water particles into tiny droplets, thus becoming an ultrasonic atomizer. The higher the frequency of the piezoelectric transducer, the finer the water droplets. The water droplets are propelled or pumped downward by the vibration of the transducer 14 into the inverted funnel 38 where they are guided into a linear stream of water droplets. The width of the stream is maintained by the elliptic bristle array 40 coupled to the bottom of the inverted funnel 38, which serves to further funnel the atomized water droplets into a linear spray. The water droplets that contact the bristles condense on them, and drip off their bottom end. The atomized spray is thus projected out of the bottom of the atomizer unit 2 while larger condensed water drops fall in an elliptical pattern from the bristle array around the atomized spray, onto the sharpening disc. These can also be extracted off of the bristle array 40 when the blade is brought into contact with the bristle array 40. The blade would optionally be brought into contact with the bristles if the user feels there is excessive frictional heat building up in the blade.

In the preferred embodiment, the power required to operate this ultrasonic atomizing module is 5 watts although in other embodiments may vary between 1 and 8 Watts. The ultrasonic atomizing driving circuit 12 provides a water shortage detection function to prevent the transducer 14 from being damaged when working in the absence of water.

Every ultrasonic nozzle operates at a specific resonant frequency, which dictates the median droplet size. Droplet sizes have little variance, and can be mathematically calculated to fall within a tight predicted drop distribution. For example, a 120 kHz nozzle produces a median drop size of 18 microns (when spraying water). The higher the frequency, the smaller the median drop size.

While certain features and aspects have been described with respect to exemplary embodiments, one skilled in the art will recognize that numerous modifications are possible. Consequently, although several exemplary embodiments are described above, it will be appreciated that the invention is intended to cover all modifications and equivalents within the scope of the following claims.

Having thus described the invention, what is claimed as new and desired to be secured by Letters Patent is as follows:

1. A fluid atomizer unit for a blade sharpening device comprising:

a housing body having an atomized water delivery orifice formed therethrough a bottom face;

a top cover mechanically attachable to said housing body, said top cover having a well formed therein, said well having a well orifice centrally formed therethrough and an internally threaded circular side wall;

an ultrasonic atomizing driving circuit mounted in said housing body;

a piezoelectric ultrasonic transducer operationally connected to said ultrasonic atomizing driving circuit, said piezoelectric ultrasonic transducer having a central nozzle and sandwiched between an inner bottom face of said housing body and an outer bottom face of said well such that said central nozzle, said well orifice and said water delivery orifice are vertically aligned;

an inverted funnel affixed to an outer bottom face of said housing body, said funnel centered around the atomized water delivery orifice, and having a lower peripheral flange and elliptical tab formed thereon that matingly engage an elliptical socket formed in the top of said substrate base;

a bristle array arranged in a pattern on a substrate base that is affixed to a bottom of said inverted funnel; and a reservoir vessel engageable into said well;

wherein said piezoelectric ultrasonic transducer is sandwiched between an inner bottom face of said housing body and an outer bottom face of said well such that said central nozzle, said well orifice and said water delivery orifice are vertically aligned;

a vertically slotted feed tube within said reservoir vessel; and a plunger housed within said feed tube, said plunger sealing a bottom of said feed tube when forced to its lowest position by a compression spring within said feed tube.

2. The fluid atomizer unit for the blade sharpening device of claim 1 wherein said bristle array is arranged in an elliptical pattern on said substrate base that has an elliptical configuration.

3. The fluid atomizer unit for the blade sharpening device of claim 2 further comprising:

an L shaped connection bracket connectable to a blade sharpening device, said bracket having a vertical slot formed therethrough;

wherein said housing body has a pin and threaded orifice on a back face thereof;

a threaded fastener sized to pass through said vertical slot and to engage in said threaded orifice to connect said atomizer unit to said bracket; and wherein said pin is sized for sliding engagement within said vertical slot when said atomizer unit is connected to said bracket.

4. The fluid atomizer unit for the device of claim 3 further comprising:

a USB socket operationally connected to said an ultrasonic atomizing driving circuit, said socket engageable with a USB power supply; and a power switch connected to said ultrasonic atomizing driving circuit.

5. The fluid atomizer unit for the blade sharpening device of claim 1 further comprising:

an L shaped connection bracket connectable to a blade sharpening device, said bracket having a vertical slot formed therethrough;

wherein said housing body has a pin and threaded orifice on a back face thereof;

a threaded fastener sized to pass through said vertical slot and to engage in said threaded orifice to connect said atomizer unit to said bracket; and wherein said pin is sized for sliding engagement within said vertical slot when said atomizer unit is connected to said bracket.

* * * * *